US 008407050B2

(12) United States Patent
Kobal et al.

(10) Patent No.: US 8,407,050 B2
(45) Date of Patent: *Mar. 26, 2013

(54) METHOD AND SYSTEM FOR AUTOMATIC TRANSCRIPTION PRIORITIZATION (75) Inventors: Jeffrey S. Kobal, Lake Worth, FL (US); Girish Dhanakshirur, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,142

(22) Filed: Jan. 19, 2012

(65) Prior Publication Data

US 2012/0166193 A1 Jun. 28, 2012

Related U.S. Application Data

(63) Continuation of application No. 11/401,792, filed on Apr. 11, 2006, now Pat. No. 8,121,838.

(51) Int. Cl.
*G10L 15/26* (2006.01)
(52) U.S. Cl. .......... 704/235; 704/231; 704/251
(58) Field of Classification Search .......... 704/231, 704/235, 251
See application file for complete search history.

(56) References Cited

U.S. PATENT DOCUMENTS

| | | | |
|---|---|---|---|
| 5,625,749 A | | 4/1997 | Goldenthal et al. |
| 5,855,000 A | * | 12/1998 | Waibel et al. ............... 704/235 |
| 5,864,805 A | | 1/1999 | Chen et al. |
| 5,983,177 A | | 11/1999 | Wu et al. |
| 6,006,183 A | | 12/1999 | Lai et al. |
| 6,122,614 A | | 9/2000 | Kahn et al. |
| 6,208,964 B1 | | 3/2001 | Sabourin |
| 6,327,566 B1 | | 12/2001 | Vanbuskirk et al. |
| 6,356,971 B1 | | 3/2002 | Katz et al. |
| 6,754,625 B2 | | 6/2004 | Olsen et al. |
| 6,850,609 B1 | | 2/2005 | Schrage |
| 6,928,407 B2 | | 8/2005 | Ponceleon et al. |
| 6,963,834 B2 | | 11/2005 | Hartley et al. |
| 6,993,482 B2 | | 1/2006 | Ahlenius |
| 7,260,534 B2 | | 8/2007 | Gandhi et al. |
| 7,783,028 B2 | * | 8/2010 | Bantz et al. .............. 379/265.06 |
| 8,121,838 B2 | | 2/2012 | Kobal et al. |
| 2003/0061054 A1 | | 3/2003 | Payne et al. |

OTHER PUBLICATIONS

Koumpis et al., "Automatic Summarization of Voicemail Messages Using Lexical and Prosodic Features, ACM Transactions on Speech and Language Processing," 2(1), pp. 1-24, Feb. 2005.
McTear, "Spoken Dialogue Technology: Enabling the Conversational User Interface, ACM Computing Surveys," 34(1), pp. 90-169, Mar. 2002.
Oard et al., "Building an Information Retrieval Test Collection for Spontaneous Conversational Speech, SIGIR '04," Jul. 26-29, 2004, Sheffield, South Yorkshire, UK.

\* cited by examiner

*Primary Examiner* — Talivaldis Ivars Smits
*Assistant Examiner* — Shaun Roberts
(74) *Attorney, Agent, or Firm* — Wolf, Greenfield & Sacks, P.C.

(57) ABSTRACT

A visual toolkit for prioritizing speech transcription is provided. The toolkit can include a logger (102) for capturing information from a speech recognition system, a processor (104) for determining an accuracy rating of the information, and a visual display (106) for categorizing the information and prioritizing a transcription of the information based on the accuracy rating. The prioritizing identifies spoken utterances having a transcription priority in view of the recognized result. The visual display can include a transcription category (156) having a modifiable textbox entry with a text entry initially corresponding to a text of the recognized result, and an accept button (157) for validating a transcription of the recognized result. The categories can be automatically ranked by the accuracy rating in an ordered priority for increasing an efficiency of transcription.

24 Claims, 4 Drawing Sheets

METHOD AND SYSTEM FOR AUTOMATIC TRANSCRIPTION PRIORITIZATION

REFERENCE TO RELATED APPLICATION

This application is a continuation of application Ser. No. 11/401,792, entitled "METHOD AND SYSTEM FOR AUTOMATIC TRANSCRIPTION PRIORITIZATION," filed on Apr. 11, 2006, the content of which is incorporated herein by reference in its entirety.

BACKGROUND

1. Field of the Invention

The invention relates to the field of speech processing and, more particularly, to speech recognition systems.

2. Description of the Related Art

A speech recognition system can recognize speech and render a text corresponding to the recognized speech. In general, a speech recognition system can identify features in a spoken utterance, and based on the identified features, distinguish the utterance from other words or phrases of a defined vocabulary. The speech recognition system can identify words, phonemes, morphemes, or other sub-word units of speech by evaluating the identified features during a speech recognition task. These units of speech can be associated with a text or a phonetic string that corresponds to the spoken utterance.

Speech recognition systems and natural language understanding systems can also include grammars. The grammars can define the rules of interaction among the units of speech during the recognition of a word or phrase. For a particular vocalization, or utterance, processed by such a system, the utterance may contain a word or phrase that matches one in an active grammar set, and that the system correctly recognizes as a match, thereby yielding a correct acceptance decision by the system. The utterance also may contain a word or phrase that does not have a match in the active grammar, and that the system correctly rejects, yielding a correct rejection decision by the system.

However, speech recognition systems can yield recognition errors. Certain words and phrases may be confused for similarly sounding words or phrases based on the grammars or features. One type of error relating to an active grammar set is the false acceptance of a word or phrase that is incorrectly interpreted as matching one in an active set. Another type of error is a false rejection, which occurs when a word or phrase that has a match in the active set is not recognized. Still another type of error can occur when a word or phrase of an utterance has a match in the active set, but is incorrectly interpreted as matching a different word or phrase, this type of error typically being characterized as a "false acceptance—in grammar." The speech recognition system may not be aware of such errors. However, the system can learn from the errors if the system is made aware of the errors.

Manual transcription is a process of having a person transcribe an audio recording of a spoken utterance to textual form. With regard to speech recognition systems that convert spoken utterances to a text, a manual transcription of the spoken utterance can be referenced for identifying text errors in the speech recognition results. For example, the person can compare the manual transcription of the spoken utterance to the text produced by the speech recognition system. Results can be validated by identifying those utterances that were incorrectly recognized. Understandably, the validation does not require a direct comparison of the manual transcription against the text results from the speech recognition system. The recognition results need not be used as a guide or starting point for the person performing the transcribing. The person performing the transcription can simply write down the text he or she hears being spoken in the utterance.

In one aspect, incorrectly recognized utterances can be used for retraining the speech recognition system. The validation process can also reveal which grammars need to be re-tuned or updated. In practice, a person listens to a spoken utterance and determines whether the recognition result is correct. For example, the spoken utterance can be presented in an audible format and the recognition result can be presented as corresponding text. The person can determine whether the text correctly corresponds to the audible spoken utterance. If a recognition result is incorrect, the user can manually update the recognition result with the correct transcription. In general, the user edits the text to correct mistakes during transcription.

Manual transcription, however, is typically a tedious process that requires human input to validate and manually correct recognition results. In addition, speech recognition systems may process hundreds or even thousands of utterances creating enormous amounts of data. The user may not be aware which utterances were interpreted less correctly than other utterances, and/or which utterances should be used to update a training or tuning of the speech recognition system. A need therefore exists for improving the efficiency by which manual transcription validates recognition results so that the performance of a speech recognition system can be enhanced.

SUMMARY OF THE INVENTION

The present invention provides a method and system for prioritizing speech transcription in validating a speech recognition performance. The prioritizing identifies spoken utterances having a transcription priority in view of a recognition result. The method can include logging information generated from a recognition task of one or more spoken utterances, categorizing the information, and prioritizing a transcription of the information based on a category. The recognition task can associate a spoken utterance with at least one recognized result. The information categorized can include at least one of a spoken utterance, a recognized result, a confidence score, and an N-best match. A transcription category can be presented which initially defaults to a text representation of the recognition result. The categories can be ranked according to an accuracy rating for identifying a priority of transcription.

One aspect of the present invention is a visual toolkit for prioritizing speech transcription. The toolkit can include a logger for capturing information from a speech recognition system during a processing of one or more spoken utterances, a processor for determining an accuracy rating of the information, and a visual display for categorizing the information and prioritizing a transcription of the information based on the accuracy rating. The prioritizing identifies spoken utterances having a transcription priority in view of the recognized result. The visual display can present a spoken utterance category having a play button for audibly presenting the spoken utterance, a recognized result category having a textbox entry for presenting the recognized result, a confidence score category identifying a numeric ranking of the recognized result, and a N-best match category having a pop-up box for presenting a textbox of neighbor recognition results. The visual display can include a transcription category having a modifiable textbox entry with a text entry initially corresponding to a text of the recognized result, and an accept button for validating a transcription of the recognized result.

The categories can be automatically ranked by the accuracy rating in an ordered priority for transcription.

Another aspect of the present invention is a method for prioritizing speech transcription for validating speech recognition performance. The method can include importing log information from a speech recognition system from a recognition task of one or more spoken utterances, and automatically filling a transcription category with a text representation of the recognized result. The method can also include determining an accuracy rating for determining a transcription priority. The accuracy rating, more particularly, can provide a weighting of a confidence score by confidence measures of closest matching neighbor recognition results. The information in the display can be automatically categorized in view of the accuracy rating, wherein the prioritizing identifies spoken utterances having a transcription priority.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

Figure 1:
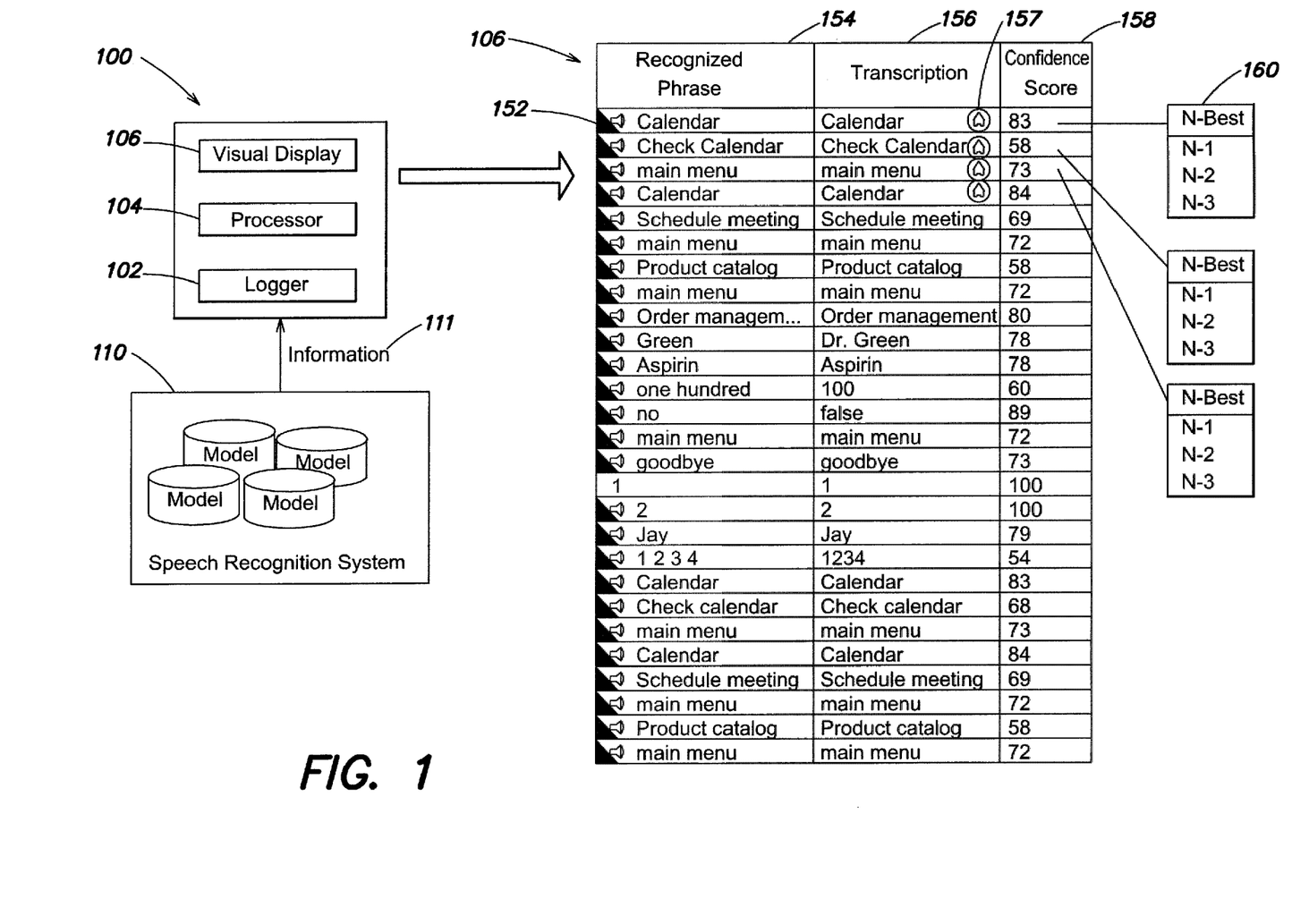
FIG. 1 is schematic diagram of a visual toolkit for prioritizing a speech transcription, according to one embodiment of the invention.

FIG. 1 is a schematic diagram of a visual toolkit 100 for prioritizing a speech transcription for validating speech recognition performance, according to one embodiment of the invention. The visual toolkit 100 illustratively includes a logger 102, a processor 104, and a visual display 106 that are communicatively linked to one another and that cooperatively perform various tasks pertaining to the prioritization of the speech transcription for validating speech recognition performance.

Operatively, the logger 102 captures from a speech recognition system 110 information 111 generated during processing of one or more spoken utterances by the system based on at least one model 112a-d. The processor 104 determines an accuracy rating of the information 112, and with the information, the visual display 106 categorizes the spoken utterances into categories.

The visual display 106 can also prioritize a transcription of the information 111 based on a category. In practice, the speech recognition system 110 associates a spoken utterance with at least one recognized result. The spoken utterance can be an acoustic waveform, a digitally recorded waveform, or any other media capable of representing a spoken utterance. The recognized result can be an output of the speech recognition system 110 and can comprise a text representation of the identified spoken utterance. For example, the speech recognition system 110 can output the recognized result in text such as a string of characters, letters, or words. The text may or may not be a correct interpretation of the spoken utterance.

The logger 102 can receive the information 111 generated from the processing of a spoken utterance. The visual toolkit 100 and the speech recognition system 110 may or may not be on the same platform. In one arrangement, the speech recognition system 110 can be remote from the visual toolkit 100, such as a remote web server. The visual toolkit 100 can receive the information 111 over a communication channel such as the ethernet or any other wired or wireless data channel. Embodiments of the invention are herein primarily concerned with the processing and the presentation of the information, and not necessarily the means by which the information is communicated. The information 111 can include the spoken utterance, the recognized result, a confidence score, an N-best (neighbor) match and any other processing results generated during the processing of the spoken utterance.

The confidence score can be a degree of confidence the speech recognition system 110 associates with the recognition of a spoken utterance. The speech recognition system 110 can include internal metrics which assign numeric values during the process of recognition. In one particular example, the speech recognition system 110 can include Hidden Markov Models (HMMs) for identifying phonemes of speech. Each HMM can associate a feature vector of speech with a phoneme to produce a maximum likelihood score. In another example, the speech recognition system 110 can include a neural network (NN) having a processing layer of computation nodes, or artificial neurons, for recognizing patterns in speech. The NN can generate statistical probabilities, or scores, for quantifying the likelihood of a recognized match. Scores can be based on a distance metric describing the closeness of the feature vector to the parameters of the phoneme represented by the HMM of the NN. In general, the confidence score describes the confidence that the speech recognition system 110 associates with the recognized result. The confidence score can be a number or a percentile.

An N-best (Neighbor) match is the closest set of recognized results following the recognized result. For example the speech recognition system 110 can identify a plurality of neighbor candidates during the recognition process of which each candidate will have an associated confidence score. Understandably, the speech recognition system 110 generally selects the recognition result having the highest confidence scores. The remaining candidates can be ranked by confidence score to produce an N-best match; that is, the list of length N having the next closest match to the spoken utterance.

The processor 102 can produce an accuracy rating from the information 111. The accuracy rating can be an update to the confidence score based on the N-best matches. For example, a high confidence score can be initially interpreted as a high accuracy result; that is, that the text output by the speech recognition system 110 is a good match for the spoken utterance. However, if the N-best matches also have similarly high confidence scores, the confidence score can be considered less accurate. Understandably, a high accuracy rating is generally associated with a text output having a high confidence score relative to all other output matches. Notably, the processor 102 compares the confidence score of the output text to the N-best matches and determines a distance metric for each candidate. The processor 102 assigns an accuracy rating based on the confidence score in view of the distance metrics. The processor 102 decreases the accuracy rating of a text output if the distance metrics of the N-best matches are sufficiently large or approximate the confidence score of the text output.

The visual display 106 presents the information 111 in a visible format. For example, the visual display can be a computer screen, and the information 111 can be presented through a software-implemented graphical user interface (GUI). The visual display 106 can parse and categorize the information 111 in an arranged format. This can include a spoken utterance category 152 having a play button for audibly presenting the spoken utterance, a recognized result category 154 having a textbox entry for presenting the recognized result, a confidence score category 158 identifying a numeric ranking of the recognized result, and a N-best match category 160 having a pop-up box for presenting a textbox of neighbor recognition results. Notably, a recognition result is a text representation of the recognized spoken utterance that may be one of a correct or incorrect interpretation of the spoken utterance.

The visual toolkit 100 can also include a transcription category 156 having modifiable textbox entry with a text entry that initially corresponds to a text of the recognized result. An accept button 157 can be associated with the information of a processed spoken utterance for validating a transcription of the recognized result.

In one aspect, the categories can be automatically ranked by the accuracy rating in an ordered priority for transcription. For example, the visual toolkit 100 can present the information 111 based on the accuracy rating determined by the processor 102. Those recognition results having the highest recognition score can be placed at the bottom of the list in the visual display 106. And, the recognition results having the lowest recognition score can be placed at the top of the list in the visual display. Understandably, a user in charge of validating transcriptions can start with the poorly recognized results in order to update the speech recognition system 110 with the errors of the lowest recognition spoken utterances. As described, the speech recognition system 110 can be tuned or updated to improve a recognition performance. The tuning and updating generally require presenting examples which failed, their incorrect interpretation being given by the recognition results, and the correct interpretation being the transcription. Accordingly, a user can transcribe those recognition results having the lowest accuracy rating first for initially updating and tuning the speech recognition system 110. In practice, skilled transcription services can be costly. A benefit of the prioritization can reduce costs by classifying results into skilled and non-skilled categories. The least accurate results can be sent to a skilled transcriber for in-depth analysis, and the most accurate results can be sent to a non-skilled transcriber. The non-skilled personnel can validate the recognition results of the automatic speech recognition system while skippin the recognition results that are incorrect Embodiments of the invention primarily concern an automated method and system for automatically filling transcriptions in a speech application. Accordingly, the visual toolkit 100 can automatically fill the transcription columns 156 with the text of the recognized phrase 154 so as to expedite the manual validation process. In another aspect, the visual display 106 can automatically fill in the transcriptions starting at the top of the ordered list and working downwards into the list. Each line in the visual display 106 can also be controlled, for example, by positioning a cursor and "clicking on" in order to auto-complete the filling of an N-best results pop-up list.

The user performing the validation listens to the spoken utterance 152, determines if the recognized phrase 154 is correct, and modifies the text of the transcription 156 in order to correct errors. The automatic filling of the transcription category 156 with the recognized phrase 154 can save the user time in manually transcribing the correct interpretation of the recognized text. The accept button 157 can also reduce the amount of time required for transcription in view of the automated filling process. For example, a correctly transcribed phrase need not be modified or edited. Accordingly, the user can accept the transcription by hitting the accept button 157, versus manually typing in a carriage return within the textbox of the transcription 156. The visual toolkit 100 can also detect a "click" action to automatically fill transcriptions.

In one arrangement, to further improve transcription efficiency, the ordered priority is identified by a color code associated with the transcription priority. The prioritizing identifies spoken utterances having a transcription priority in view of the accuracy rating. For example, the visual display 106 can display a green accept button for validated transcriptions, and a red button for invalidated transcription. A validated transcription is one in which the recognized phrase 154 is a correct interpretation of the spoken utterance 152. Accordingly, the transcription is valid as it has been already automatically filled with the text of the recognition result. An invalidated transcription is one in which the recognized phrase 154 is an incorrect interpretation of the spoken utterance 152. Accordingly, the user is required to modify the text of the transcription 156 such that it matches the text representation of the spoken utterance. Notably, the invalidated transcriptions can be prioritized, or ranked, according to the accuracy rating. In one arrangement, color codes can be assigned on the accuracy rating. For example, a spectrum of colors can be assigned to the range of accuracy ratings which may include, for example, the colors yellow, orange, blue, and green. These are only exemplary, and it is to be understood that the invention is not limited to these.

Figure 2:
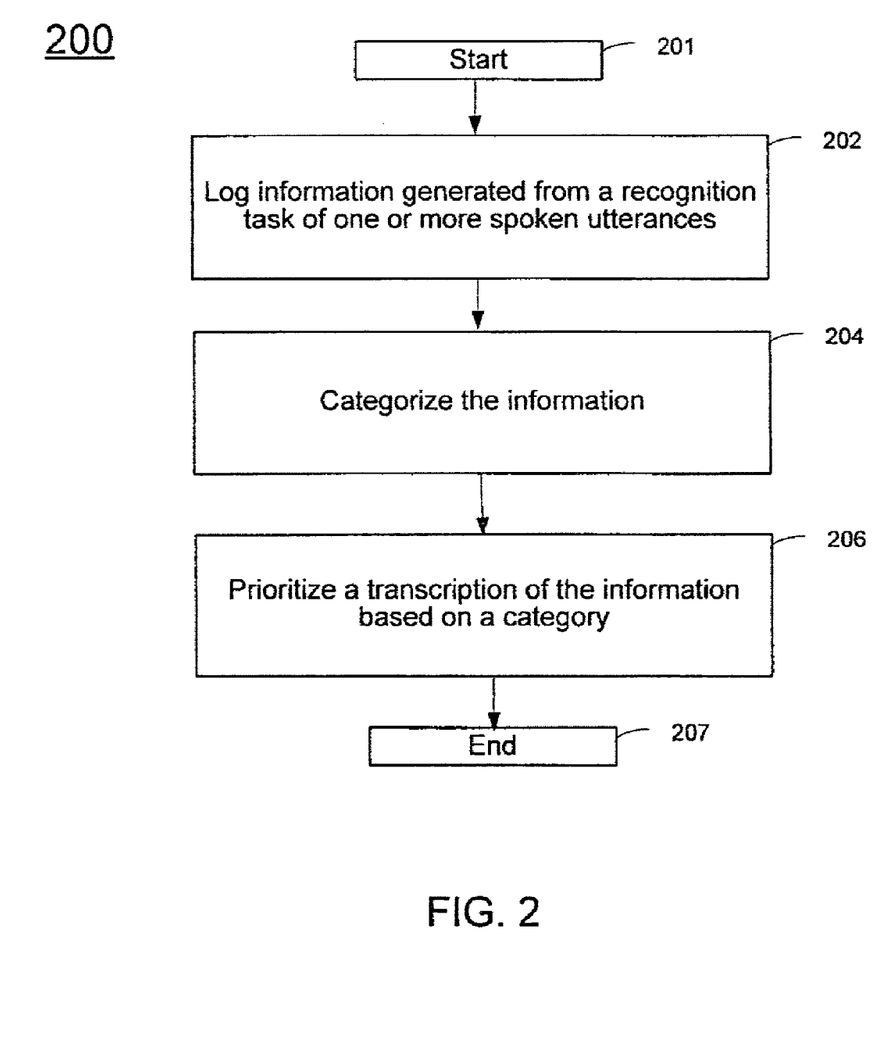
FIG. 2 is a flowchart of exemplary steps of a method for prioritizing a speech transcription, according to another embodiment of the invention.

Referring to FIG. 2, the exemplary steps of a method 200 for prioritizing speech transcription for validating speech recognition performance, according to another embodiment of invention, are shown. When describing the method 200, reference will be made to FIG. 1, although it is explicitly noted that the method 200 can be practiced in any other suitable system or device. Moreover, the steps of the method 200 are not limited to the particular order in which they are presented in FIG. 2. The inventive method can also have a greater number of steps or a fewer number of steps than those shown in FIG. 2.

At step 201 the method can begin. At step 202, information generated from a recognition task of one or more spoken utterances can be logged. The information includes at least one of a spoken utterance, a recognized result, a confidence score, and an N-best match. For example, referring to FIG. 1, the speech recognition system 110 performs the speech recognition task or tasks that produce the information during a processing of a spoken utterance. A spoken utterance can be submitted to the speech recognition system 110 which generates a text output. The text output may or may not be a correct interpretation of the spoken utterance.

At step 204, the information can be categorized. For example, referring to FIG. 1, categories can be determined from the information 111, which include a spoken utterance category 152, a recognized result category 154, a confidence score category 158, and a N-best match category 160. A transcription category 156 can also be included in the visual display 160. The transcription can be presented as a modifiable text, wherein the transcription initially defaults to a text representation of the recognition result. Understandably, the transcription may be one of a correct or incorrect interpretation of the spoken utterance. The categories can be presented in the visual display 106.

At step 206, a transcription of the information can be prioritized based on a category. Notably, the prioritizing identifies spoken utterances having a transcription priority based on recognition results. For example, referring to FIG. 1, the prioritizing is based on a category such as an accuracy rating, wherein the accuracy rating is a weighting of the confidence score by the N-best matches. The accuracy rating (not shown) may also be categorized in the visual display with the confidence score 158. The processor 102 determines the accuracy rating by comparing the confidence scores of the N-best matches with the confidence score of the recognized result. Initially, the accuracy rating is assigned a score corresponding to the confidence score of the recognized result. If the N-best matches have significantly lower confidence scores, then the confidence score of the recognized result is unchanged. If the N-best matches have neighbor confidence scores approximating the confidence score, then the accuracy rating is lowered. The accuracy rating can be scaled on a linear or non-linear scale as a function of the N-best match confidence scores. At step 207, the method illustratively concludes.

Figure 3:
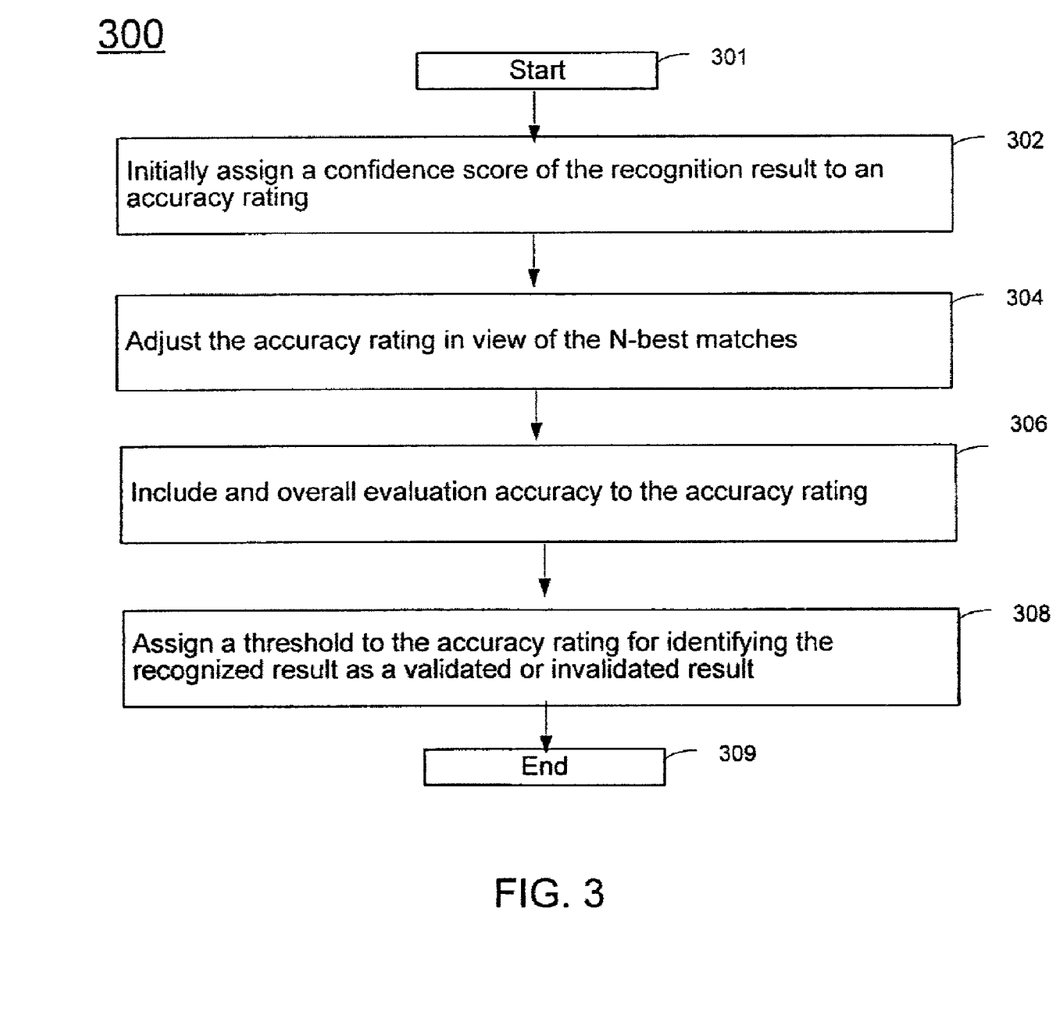
FIG. 3 is a flowchart of exemplary steps of a method for determining an accuracy rating for prioritizing a speech transcription, according to yet another embodiment of the invention.

Referring to FIG. 3, the exemplary steps of a method 300, based on an algorithm 300 for determining the accuracy rating according to still another embodiment, are illustrated. Reference will be made to FIG. 1 for identifying elements of the invention concerned with the method steps. At step 301, the process illustratively begins. At step 302, the accuracy rating can be initially assigned the confidence score of the recognition result. For example, referring to FIG. 1, the processor 102 can extract a confidence score of a processed result which can be obtained from the information 111 associated with a spoken utterance. The processor 102 can create an accuracy rating variable in computer memory and store the confidence score.

At step 304, an accuracy rating can be adjusted in view of the N-best matches. For example, referring to FIG. 1, the processor 102 can calculate a numeric distance between each neighbor candidate confidence score and the recognition result confidence score. The processor 102 can generate a list of numeric distances and order the N-best list based on the distances. In one arrangement, the processor can weight the distances, such as by averaging the N-best distance measures, or by applying non-linear weights to the N-best distance scores. For example, the acoustic confusability, the duration of the utterance, an intelligibility metric, or a quality measure of the speech features can be used to weight the N-best distances. The weighting produces a total N-best distance measure that can be compared to the confidence score of the recognized results. The processor 102 can determine a scaling from the total N-best distance measure relative to the confidence score. For example, a mapping can associate the N-best distance measure with a scaling factor. Understandably, the scaling factor is applied to the accuracy rating to adjust the accuracy rating in accordance with the N-best distance measure.

At step 306, an overall evaluation accuracy can be included with the accuracy rating. The overall evaluation accuracy can be included through an addition operation or a multiplication operation such as a scaling. In one aspect, a phonetic analysis of the N-best results can be conducted to determine a suitable scaling factor. For example, utterances having more phonemes generally require more recognition grammars which can increase the likelihood of errors. Also, an acoustic confusability can be determined to assign scaling weights based on a confusability metric. Utterances having greater acoustic complexity can be given greater weight. In addition, a correlation difference with other spoken utterances producing the same recognized result can be included. For instance, similar sounding utterances may be mistakenly interpreted as another utterance on a consistent basis. Understandably, identifying those utterances producing similar incorrect recognition results can be given a higher weighting. The higher weighting can prompt the speech recognition system to further evaluate those incorrectly processed utterances for tuning and updating the recognition system.

At step 308, a threshold can be assigned to the accuracy rating for identifying the recognized result as a validated or invalidated result. For example an accuracy rating above a threshold identifies validated results, and an accuracy rating below a threshold identifies invalidated results. An accept criteria can be assigned to validated results, and a reject criteria can be assigned to invalidated results. At step 309 the algorithm can end.

Figure 4:
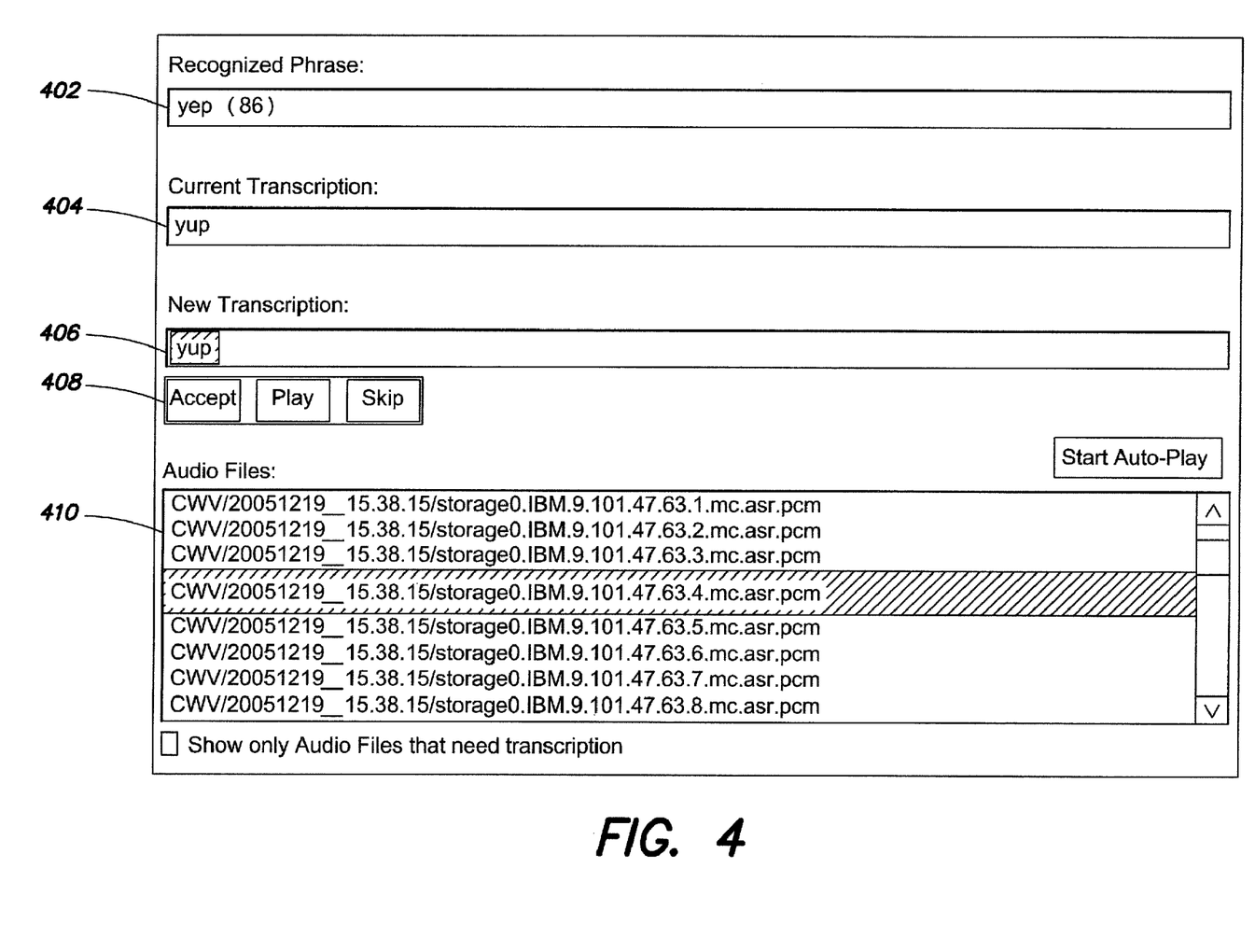
FIG. 4 is an exemplary graphical user interface of a visual toolkit for prioritizing a speech transcription, according to still another embodiment of the invention.

Referring to FIG. 4, another embodiment of the visual toolkit for prioritizing a speech transcription is shown. The visual toolkit can include a recognized phrase field 402 for presenting a text form of a recognized result, a current transcription field 404 which can default to the text form of the recognized result, a new transcription field 406 for updating the recognized result if the current transcription is incorrect, a button panel 408 for handling the visual toolkit and navigating through audio files in the audio file list 410. The button panel can include buttons for accept, play, skip, and auto-play. The audio file list 410 can include a list of spoken utterances to transcribe. For example, a user can play 408 an audio file of a spoken utterance in the audio list 410. The user can listen to the spoken utterance and determine if the text generated by the speech recognition system corresponds to a correct interpretation of the spoken utterance. If the text form of the recognized result 402 is correct, the user can accept the default text form of the recognized result 404, and proceed to listen to the next audio file. If the text form of the recognized result 402 is incorrect, the user can edit the text in the new transcription field 406. The user can accept the new text to correspond to the recognized result.

As described herein, with a method of prioritizing speech transcription for validating speech recognition performance according to one embodiment of the invention, information can be logged from a speech recognition system during a recognition of one or more spoken utterances. The information can be categorized and presented in a visual display, and a transcription category can be automatically filled with a text representation of the recognized result. Automatically filling the transcription with the recognized results saves time during validation. The categories can be prioritized for transcription based on an accuracy rating. The accuracy rating can be a weighting of the confidence score by the N-best matches. Accordingly, a visual display can be automatically prioritized for identifying spoken utterances having a transcription priority in view of a recognition result.

The method described herein has been provided for purposes of illustration only. As such, it should be appreciated that particular steps can be performed in varying order without departing from the spirit or essential attributes of the present invention.

The present invention can be realized in hardware, software, or a combination of hardware and software. Aspects of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Aspects of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for prioritizing speech recognition results to be evaluated by a human transcriptionist, the method comprising acts of:
    associating a first accuracy rating with a first recognized phrase, the first recognized phrase being a portion of a first recognized text generated at least in part by performing speech recognition processing on one or more first spoken inputs;
    associating a second accuracy rating with the second recognized phrase, the second recognized phrase being a portion of a second recognized text generated at least in part by performing speech recognition processing on one or more second spoken inputs; and
    presenting the first and second recognized phrases to the human transcriptionist for evaluation, wherein:
        the first recognized phrase is presented in such a manner as to be outside a context of the first recognized text and dissociated from at least one other portion of the first recognized text,
        the second recognized phrase is presented in such a manner as to be outside a context of the second recognized text and dissociated from at least one other portion of the second recognized text, and
        at least one visual indication is provided to reflect a priority between the first and second recognized phrases, the priority being based at least in part on ranking the first and second accuracy ratings.

2. The method of claim 1, wherein the act of associating the first accuracy rating comprises acts of:
    determining an initial accuracy value for the first recognized phrase, the initial accuracy value being a confidence score output by an automatic speech recognition process and being associated with a confidence that the first recognized phrase is an accurate recognition of the one or more first spoken inputs; and
    adjusting the initial accuracy value to determine the first accuracy rating, wherein the act of adjusting the initial accuracy value is based at least in part on confidence scores associated with candidate phrases in an N-best set of matching candidate phrases for the first recognized phrase.

3. The method of claim 2, wherein the act of adjusting the initial accuracy value comprises acts of:
    calculating, for each one of the candidate phrases in the N-best set of matching candidate phrases, a numeric distance between the confidence score associated with the one of the candidate phrases and the confidence score associated with the first recognized phrase; and
    calculating a weighted sum of the numeric distances for the candidate phrases in the N-best set of matching candidate phrases.

4. The method of claim 1, wherein the first accuracy rating is higher than the second accuracy rating, and wherein the at least one visual indication comprises presenting the first and second recognized phrases in an order indicative of the first recognized phrase having higher priority than the second recognized phrase.

5. The method of claim 1, wherein the at least one visual indication comprises:
    presenting the first recognized phrase in a first color selected based at least in part on the first accuracy rating associated with the first recognized phrase; and
    presenting the first recognized phrase in a second color selected based at least in part on the second accuracy rating associated with the second recognized phrase, the second color being different from the first color.

6. The method of claim 1, wherein the one or more first spoken inputs are different from the one or more second spoken inputs.

7. The method of claim 1, further comprising acts of:
    presenting at least one first user interface element which, when activated, causes at least a portion of a first audio file to be audibly rendered to the human transcriptionist, the first audio file comprising the one or more first spoken inputs; and
    presenting at least one second user interface element which, when activated, causes at least a portion of a second audio file to be audibly rendered to the human transcriptionist, the second audio file being different from the first audio file and comprising the one or more second spoken inputs.

8. The method of claim 1, further comprising acts of:
    selecting, based at least in part on the first accuracy rating, the first recognized phrase for presentation to the human transcriptionist; and
    selecting, based at least in part on the second accuracy rating, the second recognized phrase for presentation to the human transcriptionist.

9. A system for prioritizing speech recognition results to be evaluated by a human transcriptionist, the system comprising at least one processor programmed to:
    associate a first accuracy rating with a first recognized phrase, the first recognized phrase being a portion of a first recognized text generated at least in part by performing speech recognition processing on one or more first spoken inputs;
    associate a second accuracy rating with the second recognized phrase, the second recognized phrase being a portion of a second recognized text generated at least in part by performing speech recognition processing on one or more second spoken inputs; and
    present the first and second recognized phrases to the human transcriptionist for evaluation, wherein:
        the first recognized phrase is presented in such a manner as to be outside a context of the first recognized text and dissociated from at least one other portion of the first recognized text,
        the second recognized phrase is presented in such a manner as to be outside a context of the second recognized text and dissociated from at least one other portion of the second recognized text, and
        at least one visual indication is provided to reflect a priority between the first and second recognized phrases, the priority being based at least in part on ranking the first and second accuracy ratings.

10. The system of claim 9, wherein the at least one processor is programmed to associate the first accuracy rating at least in part by:
determining an initial accuracy value for the first recognized phrase, the initial accuracy value being a confidence score output by an automatic speech recognition process and being associated with a confidence that the first recognized phrase is an accurate recognition of the one or more first spoken inputs; and
adjusting the initial accuracy value to determine the first accuracy rating, wherein the act of adjusting the initial accuracy value is based at least in part on confidence scores associated with candidate phrases in an N-best set of matching candidate phrases for the first recognized phrase.

11. The system of claim 10, wherein the at least one processor is programmed to adjust the initial accuracy value at least in part by:
calculating, for each one of the candidate phrases in the N-best set of matching candidate phrases, a numeric distance between the confidence score associated with the one of the candidate phrases and the confidence score associated with the first recognized phrase; and
calculating a weighted sum of the numeric distances for the candidate phrases in the N-best set of matching candidate phrases.

12. The system of claim 9, wherein the first accuracy rating is higher than the second accuracy rating, and wherein the at least one visual indication comprises presenting the first and second recognized phrases in an order indicative of the first recognized phrase having higher priority than the second recognized phrase.

13. The system of claim 9, wherein the at least one visual indication comprises:
presenting the first recognized phrase in a first color selected based at least in part on the first accuracy rating associated with the first recognized phrase; and
presenting the first recognized phrase in a second color selected based at least in part on the second accuracy rating associated with the second recognized phrase, the second color being different from the first color.

14. The system of claim 9, wherein the one or more first spoken inputs are different from the one or more second spoken inputs.

15. The system of claim 9, wherein the at least one processor is further programmed to:
present at least one first user interface element which, when activated, causes at least a portion of a first audio file to be audibly rendered to the human transcriptionist, the first audio file comprising the one or more first spoken inputs; and
present at least one second user interface element which, when activated, causes at least a portion of a second audio file to be audibly rendered to the human transcriptionist, the second audio file being different from the first audio file and comprising the one or more second spoken inputs.

16. The system of claim 9, wherein the at least one processor is further programmed to:
select, based at least in part on the first accuracy rating, the first recognized phrase for presentation to the human transcriptionist; and
select, based at least in part on the second accuracy rating, the second recognized phrase for presentation to the human transcriptionist.

17. At least one computer-readable storage device having encoded thereon instructions that, when executed by at least one processor, perform a method for prioritizing speech recognition results to be evaluated by a human transcriptionist, the method comprising acts of:
associating a first accuracy rating with a first recognized phrase, the first recognized phrase being a portion of a first recognized text generated at least in part by performing speech recognition processing on one or more first spoken inputs;
associating a second accuracy rating with the second recognized phrase, the second recognized phrase being a portion of a second recognized text generated at least in part by performing speech recognition processing on one or more second spoken inputs; and
presenting the first and second recognized phrases to the human transcriptionist for evaluation, wherein:
the first recognized phrase is presented in such a manner as to be outside a context of the first recognized text and dissociated from at least one other portion of the first recognized text,
the second recognized phrase is presented in such a manner as to be outside a context of the second recognized text and dissociated from at least one other portion of the second recognized text, and
at least one visual indication is provided to reflect a priority between the first and second recognized phrases, the priority being based at least in part on ranking the first and second accuracy ratings.

18. The at least one computer-readable storage device of claim 17, wherein the act of associating the first accuracy rating comprises acts of:
determining an initial accuracy value for the first recognized phrase, the initial accuracy value being a confidence score output by an automatic speech recognition process and being associated with a confidence that the first recognized phrase is an accurate recognition of the one or more first spoken inputs; and
adjusting the initial accuracy value to determine the first accuracy rating, wherein the act of adjusting the initial accuracy value is based at least in part on confidence scores associated with candidate phrases in an N-best set of matching candidate phrases for the first recognized phrase.

19. The at least one computer-readable storage device of claim 18, wherein the act of adjusting the initial accuracy value comprises acts of:
calculating, for each one of the candidate phrases in the N-best set of matching candidate phrases, a numeric distance between the confidence score associated with the one of the candidate phrases and the confidence score associated with the first recognized phrase; and
calculating a weighted sum of the numeric distances for the candidate phrases in the N-best set of matching candidate phrases.

20. The at least one computer-readable storage device of claim 17, wherein the first accuracy rating is higher than the second accuracy rating, and wherein the at least one visual indication comprises presenting the first and second recognized phrases in an order indicative of the first recognized phrase having higher priority than the second recognized phrase.

21. The at least one computer-readable storage device of claim 17, wherein the at least one visual indication comprises:
presenting the first recognized phrase in a first color selected based at least in part on the first accuracy rating associated with the first recognized phrase; and presenting the first recognized phrase in a second color selected based at least in part on the second accuracy rating associated with the second recognized phrase, the second color being different from the first color.

22. The at least one computer-readable storage device of claim 17, wherein the one or more first spoken inputs are different from the one or more second spoken inputs.

23. The at least one computer-readable storage device of claim 17, wherein the method further comprises acts of:
presenting at least one first user interface element which, when activated, causes at least a portion of a first audio file to be audibly rendered to the human transcriptionist, the first audio file comprising the one or more first spoken inputs; and presenting at least one second user interface element which, when activated, causes at least a portion of a second audio file to be audibly rendered to the human transcriptionist, the second audio file being different from the first audio file and comprising the one or more second spoken inputs.

24. The at least one computer-readable storage device of claim 17, wherein the method further comprises acts of:
selecting, based at least in part on the first accuracy rating, the first recognized phrase for presentation to the human transcriptionist; and
selecting, based at least in part on the second accuracy rating, the second recognized phrase for presentation to the human transcriptionist.

* * * * *